R. FITZ POWER.
CONTROL OF AEROPLANES.
APPLICATION FILED JULY 21, 1917.
1,296,848.
Patented Mar. 11, 1919.
2 SHEETS—SHEET 1.
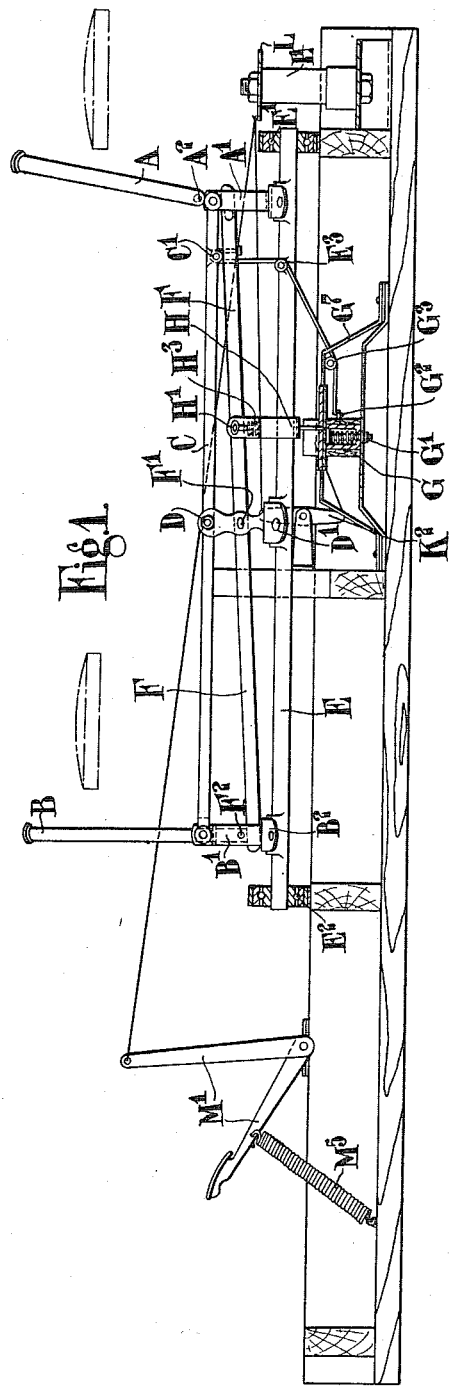
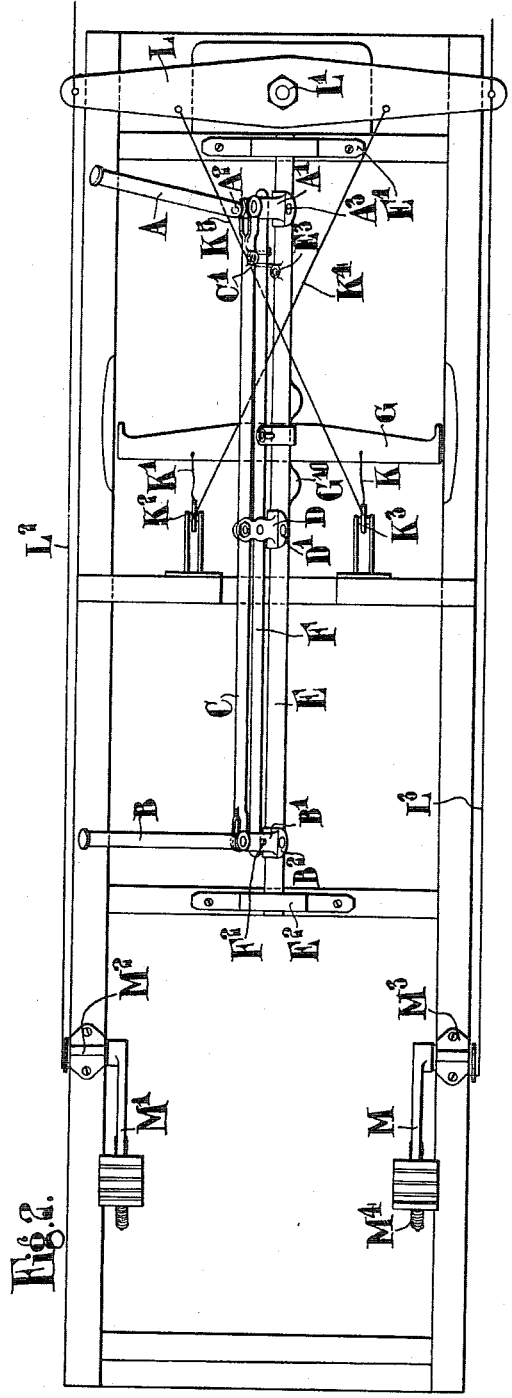
INVENTOR
Richard Fitz Power
BY Bacon & Milans
ATTORNEY R. FITZ POWER.
CONTROL OF AEROPLANES.
APPLICATION FILED JULY 21, 1917.
1,296,848.
Patented Mar. 11, 1919.
2 SHEETS—SHEET 2.
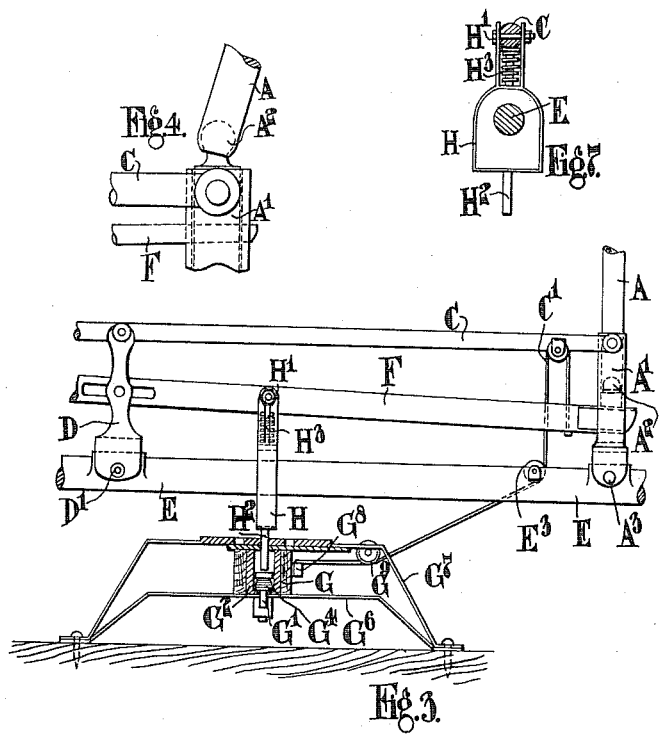
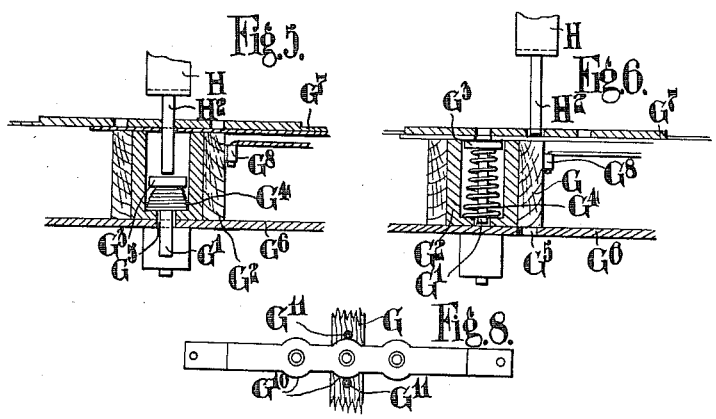
INVENTOR
Richard Fitz Power
BY
ATTORNEY

UNITED STATES PATENT OFFICE.

RICHARD FITZ POWER, OF DOVERIDGE, ENGLAND, ASSIGNOR OF ONE-HALF TO OLIVER WOLCOTT THOMAS, OF ITHACA, NEW YORK.

CONTROL OF AEROPLANES.

1,296,848.   Specification of Letters Patent.   Patented Mar. 11, 1919.

Application filed July 21, 1917. Serial No. 182,054.

*To all whom it may concern:*

Be it known that I, RICHARD FITZ POWER, a subject of the King of Great Britain and Ireland, and a resident of Doveridge, Derby, England, have invented new and useful Improvements in and Relating to the Control of Aeroplanes, of which the following is the specification.

In aeroplanes as hitherto constructed wherein provision is made for dual control, if the pilot should be killed, disabled, or become unconscious, difficulty arises when the observer inserts his operating lever, commonly called a "control-stick" into the operating socket in order to take control, in that the unconscious body or limbs of the pilot may be holding, resting upon, or otherwise fouling the corresponding free operation or movement of the pilot's "control-stick" or operating lever and vertical rudder operating bar. This disadvantage which arises in mechanism hitherto employed, becomes very serious if the weight of the limbs or body of the pilot has to be moved by the observer in operating the pilot's "control-stick" and foot bar simultaneously with the effort to control the aeroplane.

The object of my invention is to provide means for overcoming the foregoing difficulty and disadvantage, and further to provide means for releasing the "control-stick" and foot rudder bar of the pilot and render them quite free and inoperative when the observer has inserted and forced home the base of his "control-stick" or operating lever into the socket provided for same. A further object is to provide means to enable the pilot to again take control if he should recover consciousness.

According to my invention I make the pilot's operating lever or "control-stick" slidable telescopically in the lower socket. I form longitudinal slots through the socket as at present constructed adapted to receive the observer's "control-stick". Precisely similar longitudinal slots are also formed through the socket in which the "control-stick" of the pilot is adapted to slide.

I construct the "control-stick" of the pilot at its lower end with a ball and socket or other universal joint, the socket of such joint being of the same diameter as the stick or lever and like it is adapted to slide telescopically in the lower end or main socket which as before described is slotted. Thus if the "control-stick" of the pilot is lifted in the lower or main socket in order to raise the ball and socket joint above the upper end of the said outer or main socket, the universal joint comes into operation, and the said main socket can then be moved freely by the observer without its being affected by the pilot's "control-stick" or by his hold thereon.

I provide a longitudinal lever fulcrumed at its center in a rocking vertical link which is placed exactly midway between the said main sockets provided respectively for the "control-sticks" of the pilot and observer. The said vertical link therefore partakes of the same movement longitudinally and laterally of both the before-mentioned lower or main sockets, and the said lever ends pass through the slots in the said main sockets and also through the slot in the ball socket of the pilot's "control-stick".

I provide a detachable pin fitting through holes formed through the said socket of the observer's "control-stick" at such a position below that portion of the rocking lever which passes through the slots that the rocking lever is retained in its normal position, *i. e.* with the rearmost end at the bottom and the foremost end at the top of the respective slots. The pin must be removed by the observer before he can insert his operating lever or "control-stick" sufficiently far in its socket to operate the said longitudinal rocking lever. The two said main sockets are secured in the known manner to the longitudinal shaft mounted in ball bearings, and adapted to have a partial rotation or angular movement in the said bearings.

This safety pin prevents the pilot from being able to pull out his "control-stick" as in the case of an involuntary loop and so accidentally losing control.

When the pilot becomes disabled or unconscious and it is necessary for the observer to take control, he removes the pin before mentioned and on inserting his own operating lever or "control-stick" into the socket provided for same, the said pivoted longitudinal lever, the ends of which pass through the said slots, is pressed down by the end of the observer's "control-stick", and the other end of the said longitudinal lever is correspondingly raised and forces the "control-stick" of the pilot upwardly sliding in the outer main socket. When the "control-stick" is raised sufficiently to bring the ball and socket joint out of the lower socket, the pilot's "control-stick" will move freely in either direction and can no longer operate the socket in which it slides although the pilot may be still gripping his "control-stick".

As the feet of the pilot in death or disablement may in a like manner foul the foot operating lever or vertical rudder operating bar, means must also be provided for releasing this bar from the hampering weight of the leg or legs of the pilot. For this purpose I provide a plunger or vertical rod which is loosely pivoted upon the said longitudinal rocking lever by means of a pin passing through the said plunger. The said vertical rudder operating bar has its fulcrum pin detachable instead of being fixed as hitherto, and I provide means to enable the said plunger to release the said fulcrum pin in order that the observer may take free and unhampered control by placing his feet on the rudder operating pedals as at present provided for him. When the said longitudinal rocking lever is forced upwardly at its other end by the insertion of the observer's "control-stick" into the main socket as before described, the said plunger is given an upward movement which movement effects the release of the fulcrum or pivot pin of the foot rudder operating bar or lever, and when so released, the bar or lever can no longer operate the wires connected to the vertical rudder. The fulcrum pin is provided with a disk head having fitted beneath same a strong spring, said plunger serving to hold the spring in compression and the fulcrum pin in position. On the release by the said plunger of its holding pressure upon the said pin, the spring forces the pin upwardly and out of engagement with the rack on which the said rudder operating bar or lever is mounted. The said rack instead of being formed as hitherto as a straight bar, is provided with curved flanges surrounding each pin hole in order to act as a guide for two guiding pins which are provided with rollers secured to the under-side of the said foot lever or rudder operating bar. In order to avoid the possibility of the plunger pin being drawn clear of the rack, short curved plate springs may be provided having recessed ends which are secured to the rack on each side of the holes formed in the rack.

In order to further insure the disengagement from the feet of the unconscious pilot of the foot bar or lever when the observer desires to take control, the connecting wires from the rudder operating bar are passed forwardly and secured to small levers or pulleys on the frame of the nacelle or body, from which levers or pulleys the wires extend backwardly to the vertical rudder.

I provide also that the socket for the observer's "control-stick" shall be of such depth above the before mentioned slot and longitudinal lever that the observer's "control-stick" can be partly inserted for dual control for instructional purposes, the said detachable pin then being retained in its position.

The before-mentioned plunger is also provided with a spring to press it downwardly when operating to reëngage the foot bar or lever fulcrum. This spring is compressed by the downward movement of the rearmost portion of the rocking lever, the pin fixed on the end of the plunger pressing against a sheet metal disk, until such time as the after-described wire shall have pulled the foot bar fulcrum pin back into its original position when the plunger spring operates and forces the plunger pin on to the head of the foot bar fulcrum pin which, having been guided into position by the previously described flanges and roller-pins, is forced once more into its hole in the rack.

As it is possible that the pilot may desire to recover complete control after only a temporary loss of consciousness, and in order to insure that the pilot shall regain control of the foot bar or lever on forcing his "control-stick" down into its socket, I provide a wire connection which is secured to the said longitudinal rocking lever and which passes over a small pulley or pulleys mounted on the longitudinal main link connecting the two main sockets. The said wires then pass over pulleys mounted upon the longitudinal shaft of usual construction, the other end of the wire being secured to the center of the foot bar or lever on the rear side. The above mentioned pulleys are so situated in slots cut in the upper and lower shafts respectively that the upper periphery of the upper pulley and the lower periphery of the lower pulley are each situated on the center line of their respective carrying bars. A third guiding pulley wheel is placed on the upper rack to insure a directly backward pull on the foot bar by the reëngaging cable. When therefore the pilot forces his "control-stick" downwardly in the main socket in order to regain control, the said wire by its connection to the said longitudinal rocking lever draws the foot bar backwardly in order that the said lever movement may by forcing downwardly the said plunger thrust the said fulcrum pin back into its hole or socket and thus render the pilot's foot bar or lever again operable. The plunger is provided with a spring which is in compression until the foot bar is fully drawn back.

In lieu of the three pulleys and reëngaging cable described, a spring may alternatively be provided connecting the center of the rear side of the rudder bar to the rack, of such a strength that when the pilot wishes to resume control, he inserts his stick and draws back his feet from pressing the foot bar forward, thus allowing the said spring to draw back the foot bar.

And in order that my invention may be completely understood reference should be made to the accompanying sheets of drawings which illustrate diagrammatically the preferred mode of carrying the invention into effect.

Figure 1 is an elevation of the control mechanism.

Fig. 2 is a plan of same.

Fig. 3 is a view to a larger scale of the means for releasing and recovering control of the rudder or foot bar lever.

Fig. 4 is a view to a larger scale of the ball and socket joint of the pilot's "control-stick."

Fig. 5 is a section showing the fulcrum pin in operative position.

Fig. 6 is a similar section showing the fulcrum pin of the foot bar lever released.

Fig. 7 is an end view of the plunger operating the foot bar fulcrum pin.

Fig. 8 is a detail plan view of the lower rack plate seen from below.

A is the "control-stick" of the pilot fitting the socket $A^1$, and B the "control-stick" of the observer fitting the socket $B^1$. Both levers or "control-sticks" are adapted to slide telescopically in their respective sockets, but while the lever B is removable from its socket, the lever A is connected by a ball and socket joint $A^2$ to the lower portion thereof within the socket $A^1$. The sockets $A^1$, $B^1$, are each pivoted on pins at their lower ends $A^3$, $B^2$, respectively, and the two sockets are connected together at their upper ends by the rod C. Midway between the said two sockets is the vertical link D which is pivoted upon a pin $D^1$ at its lower end. The pins $B^2$, $D^1$, and $A^3$ are all fitted upon a longitudinal shaft E mounted in ball bearings $E^1$, $E^2$, and adapted to rock or have a partial rotation therein. As the upper and lower pin centers in the "control-stick" sockets and said link, are the same distance apart, the sockets with the "control-sticks" can move freely longitudinally upon the said pins and also laterally by means of the rocking shaft E.

The rocking lever F is fulcrumed at its center upon the pin $F^1$ in the vertical link D, one end of the lever passes through and is guided in a slot in the socket $B^1$, and the other end fits through a similar slot in the socket $A^1$, and also through the lower end of the lever A, the telescoping portion at the lower end of each of the "control-sticks" A and B respectively, rest upon the said lever ends so that if one is pressed down, the other is raised in its socket. In Figs. 1 and 2 the observer's "control-stick" is shown thus pressed down, and the pilot's "control-stick" forced upwardly, so that the ball and socket joint $A^2$ is above the socket A, and the observer may then by means of his "control-stick" take control, although the "control-stick" A, may still be held by the pilot.

The hole $F^2$ is formed through the socket $B^1$ through which is fitted a removable or detachable pin which is removed by the observer before his "control-stick" can be inserted far enough to take control. The pin passes through the socket $B^1$ beneath the lever F and therefore locks this end of the lever F in the "up" position, while the other end of the lever F is at the bottom of its slot in the socket $A^1$ (the position shown in Fig. 3).

The rudder operating or foot bar G shown in plan in Fig. 2 is shown in section in Fig. 1, and is shown to a larger scale in Figs. 3, 5 and 6. The fulcrum pin $G^1$ of the rudder bar is adapted to slide vertically in a metal bush $G^2$ (see Figs. 3, 5 and 6); it is formed with a head $G^3$, and has a compression spring $G^4$, tending to thrust it upwardly. A fulcrum hole or bearing $G^5$ is provided in the lower metal carrier plate or rack $G^6$. When in the bearing hole $G^5$ as shown in Figs. 3 and 5, the fulcrum pin holds the foot bar lever G in position enabling it to be operated by the pilot. The plunger H is mounted on the pin $H^1$ in the lever F and extends around and well clear of the shaft E. The pin $H^1$ is fitted in a slot in the plunger and has the spring $H^3$ pressing it upwardly. The rod $H^2$ on the lower end of the plunger passes through the hole in the upper plate or rack $G^7$ and is adapted when moved downwardly to press on the head of the fulcrum pin $G^1$, and force it, by compressing the spring $G^4$, into the operative position shown in Figs. 3 and 5. Fig. 6 shows the fulcrum pin in the released position pressed upwardly by the spring $G^4$. Mounted on the rod C is the pulley $C^1$, a similar pulley $E^3$ being securely mounted on the rocker shaft E, a cord or wire is secured to the lever F and is passed over the pulley $C^1$ through slots in the rod, and under the pulley $E^3$ through like slots in the shaft E, the other end of the cord or wire is secured to the foot bar at $G^8$. Curved edges or flanges $G^{10}$ are provided upon the lower rack plate $G^6$ which serve as guides for the rollers $G^{11}$ which are mounted on pins projecting downwardly from the bottom of the foot bar G. The flanges $G^{10}$, while insuring that the rudder bar fulcrum pin when being drawn back shall not escape being thrust into its original hole, nevertheless do not hinder the free partial rotation of the rudder bar.

Wire connections K, K$^1$, are provided from the foot bar lever G to the lower ends of the two rocking levers K$^2$, K$^3$, which are mounted on fulcrum pins in brackets secured to the frame (see Figs. 1 and 2), and wire connections K$^4$ K$^5$ connect the upper ends of the said rocking levers in a crossed manner as shown in Fig. 2 to the lever L adapted to rock on the fulcrum pin L$^1$ secured to the machine frame and placed below the seat of the pilot. Cable or wire connections are fitted to the lever L for operating the rudder in the usual manner. Placed in front of the observer's seat and "control-stick" B, and mounted on the frame are the usual foot levers M, M$^1$, of bell crank form fulcrumed at M$^2$, M$^3$. Each lever is fitted with the usual tension spring M$^4$, M$^5$, respectively, secured at their lower ends to the frame. From the outer arms of the levers M, M$^1$, respectively, (see Fig. 2) are wire or cable connections L$^2$, L$^3$, to the ends of the lever L which is of the usual construction.

It will be observed that by means of the described mechanism, if the pilot should be injured or become unconscious, and the observer or second operator on the aeroplane inserts his "control-stick" B into the socket B$^1$ to take control after having first withdrawn the safety pin from the hole F$^2$, the lever F is thrust downwardly in the slot in the socket B$^1$ by the insertion of the "control-stick" B, and as a consequence the "control-stick" A is thrust upwardly by the other end of the said rocking lever sliding in the slot in the socket A$^1$, so that when the ball of the ball and socket joint A$^2$ is above the said socket A$^1$, the pilot's "control-stick" A, may move freely in any direction upon the ball and socket joint, so that the pilot can no longer operate his "control-stick," and the weight of his limbs or body has not to be moved by the observer in operating his "control-stick." By the insertion moreover of the "control-stick" of the observer by means of the plunger rod H$^2$ pivoted at H$^1$ to the rocking lever F, the foot bar operating lever of the pilot is completely released, the spring G$^4$ under the head of the fulcrum pin of this bar raising it out of operative connection, so that it is withdrawn from the bearing hole in the rack plate G$^6$, and so merely slides forward if pressed by the pilot's feet.

Further, if the pilot should recover consciousness and desires to regain control of the machine, he can do so by the described mechanism, by thrusting downwardly his "control-stick" A into its socket A$^1$; by means of the rocking lever F, he forces the control lever B of the observer or second operator out of its socket, and simultaneously by the thrusting downwardly of the end of the lever F in the socket A$^1$ by means of the plunger H connected to the said lever, and the cable passing over the pulleys C$^1$, E$^3$, and G$^9$, draws back the foot bar into the operative position. In this manner the foot bar fulcrum pin G$^1$ is pressed downwardly so that it engages its bearing hole in the lower rack plate and brings it again into the operative position.

What I do claim as my invention and desire to secure by Letters Patent is:—

1. Dual control mechanism for aeroplanes including two control sticks, one of said control sticks being adapted to be moved lengthwise, and means whereby upon lengthwise adjustment of said last mentioned stick the other control stick is released and rendered inoperative.

2. Dual control mechanism for aeroplanes including two control sticks and two foot controls, one of said control sticks being adapted to be adjusted lengthwise, and means whereby upon lengthwise adjustment of said last mentioned control stick the other control stick and one of the foot controls are released and rendered inoperative.

3. Dual control mechanism for aeroplanes including two control sticks, one of said control sticks being adjustable lengthwise to couple the same with the controlling means and to uncouple the same therefrom and render the stick inoperative, the other control stick being adjustable lengthwise, and means whereby upon the lengthwise adjustment of said last mentioned control stick the other control stick is shifted lengthwise to uncouple and render the same inoperative.

4. Dual control mechanism for aeroplanes including a pilot's control stick and foot control, an observer's control stick and foot control, the observer's control stick being lengthwise adjustable, and means whereby upon lengthwise adjustment of the observer's control stick the pilot's control stick and foot control are released and rendered inoperative.

5. Dual control mechanism for aeroplanes including a socket, a control stick having its lower portion telescoping in said socket, a universal joint connection between a lower portion of the control stick and an upper portion thereof, said control stick being adapted to be moved downwardly within said socket to provide a rigid connection between the socket and the control stick, and to be moved upwardly to position the universal joint of the stick outside of the socket to release the stick from rigid connection with the socket, a second control stick, and means controlled by the second control stick for adjusting the first mentioned control stick relatively to its socket to release and render the same inoperative.

6. In control mechanism for aeroplanes providing a rocking lever one end of which passes through a slot in the socket of the pilot's "control-stick," and the other through a like slot in the socket of the observer's "control-stick," fulcrumed and operating in such manner that only one of said "control-sticks" shall be effective for control at a time.

7. In control mechanism for aeroplanes, providing connecting means between the rocking lever claimed in claim 6 and the foot bar or rudder operating lever, whereby the fulcrum of the latter is released when the pilot's "control-stick" is pressed upwardly by the said rocking lever to place the ball of the universal joint above the telescoping socket.

8. Dual control mechanism for aeroplanes including an observer's control stick, a pilot's foot control lever, a fulcrum pin for said lever movable into and out of operative engagement with the lever, and means controlled by the observer's control stick for moving the fulcrum pin out of engagement with said pilot's foot control lever.

9. In control mechanism for aeroplanes, the combination with a rocking lever of the kind claimed in claim 6, of a plunger or rod pivoted thereon, which rod holds the fulcrum pin of the foot rudder bar in operative position, and spring means for releasing the said fulcrum pin from its operative position.

10. Dual control mechanism for aeroplanes including a pilot's control stick, an observer's control stick, a socket, said observer's control stick being lengthwise adjustable in the socket, means whereby upon downward movement of the observer's control stick the pilot's control stick is released and rendered inoperative, and a device to lock the observer's control stick in its uppermost position in the socket against downward movement in the socket to release the pilot's control stick.

RICHARD FITZ POWER.